MAGNETIC FEEDBACK SUPPRESSION BETWEEN BATTERY-CELL AND A TRANSISTOR AMPLIFIER

Filed April 28, 1960

FIG. 1-A

INVENTORS
M. Molloy
Z. Shabad by Greene Pineles & Durr
ATTORNEYS

United States Patent Office 3,054,863
Patented Sept. 18, 1962

3,054,863

MAGNETIC FEEDBACK SUPPRESSION BETWEEN BATTERY-CELL AND A TRANSISTOR AMPLIFIER

Martin Molloy, Croton-on-Hudson, and Zygmund Shabad, New York, N.Y., assignors to Sonotone Corporation, Elmsford, N.Y., a corporation of New York
Filed Apr. 28, 1960, Ser. No. 25,333
10 Claims. (Cl. 179—107)

This invention relates to compact transistor-amplifier units, such as hearing aids, and more particularly to battery units forming part thereof and supplying operating current thereto.

Transistor-amplifier hearing aids usually combine in a compact, miniature-size unit, a signal pickup device with a ferromagnetic transducer core and core winding, and transistor-amplifier means with a plurality of transistor stages energized by one or more battery cells for amplifying the signal currents of the pickup device and supplying the amplified currents to an output device, such as a receiver carried on the head of the user for delivering corresponding amplified sound to his hearing organs.

The present invention takes advantage of the fact that a transistor-amplifier unit of given amplifying characteristics will operate with a larger or smaller amplifier gain and power output depending on the number of battery cells connected in series for supplying operating current to the transistor-amplifier. In accordance with the invention, a transistor-amplifier means of such compact amplifier unit is arranged for interchangeable operation with an associated battery structure containing a larger or smaller number of similar serially-connected, detachably mounted battery cells, depending on the hearing needs of the user.

As an example, a commercial form of hearing aid of the invention is designed for combination with battery units containing either four, three or two battery cells, or only one battery cell, thereby assuring that the user does not have difficulty in replacing the individual battery cells with their polarity properly aligned therein. In accordance with the invention, all battery cells of such amplifier unit are detachably held with their longitudinal axis parallel and with alike poles adjacent to each other. The relatively large cell current flowing through each of the serially-connected battery cells in the same parallel direction, induces a magnetic field, and the magnetic fields of the several individual cell currents produce a magnetic leakage feedback with the core and windings of the pickup structure, thereby distorting its signal currents. According to the invention, the connector conductors by means of which the parallel-arranged and serially-connected battery cells are connected serially with each other and to the transistor-amplifier, are arranged and placed so as to provide at least one connector conductor in close proximity and along each battery cell, which passes current in the direction opposite to the cell current of its respective cell and thereby produces a magnetic field opposite to and neutralizing the disturbing effect of the magnetic field produced by the respective cell currents.

Although the principles of the invention are applicable to other types of compact, portable audio-frequency amplifier units, for instance, to miniature-size tape recorders, they will be described herein in connection with a miniature-size hearing aid worn hidden on the body of the user.

The foregoing and other objects of the invention will be best understood from the following description of exemplifications thereof, reference being had to the accompanying drawings, wherein:

FIG. 1 shows in a partially diagrammatic way and greatly exaggerated in size, a miniature-size hearing-aid amplifier unit exemplifying one form of the invention;

FIG. 1–A is a diagrammatic view of the battery section of the amplifier unit of FIG. 1;

Figure 1:
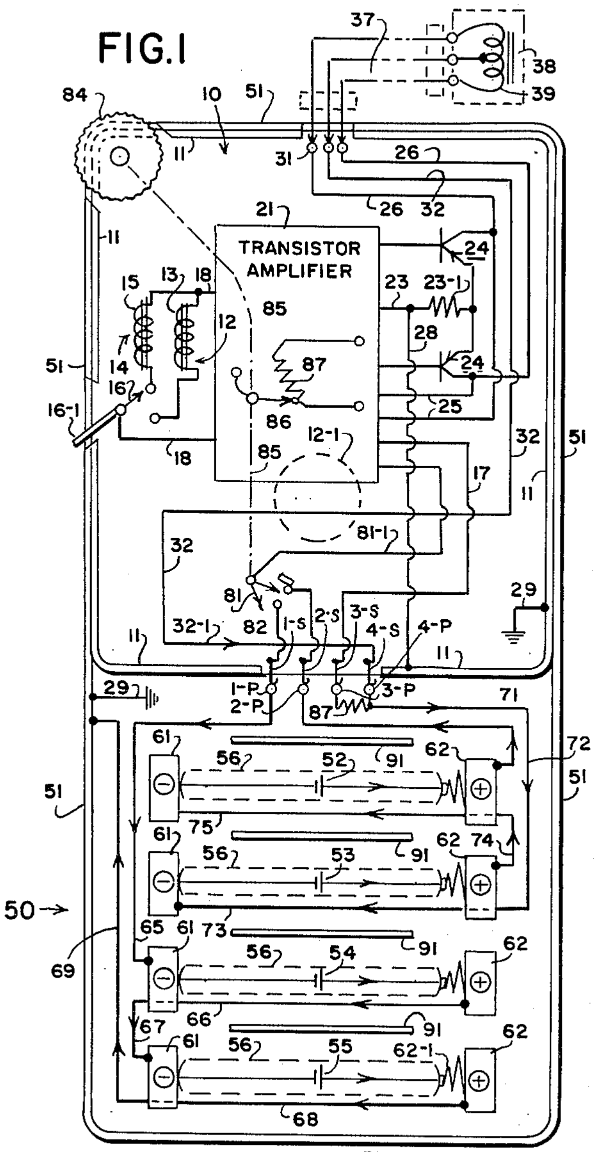

FIG. 1 shows one form of a hearing aid exemplyifying the invention. It comprises a transistor amplifier unit 10 all elements of which are enclosed in a flat, miniature-size amplifier casing 11. Within the amplifier casing 11 are shown suitably supported one or two selectively used signal pickup devices 12, 14, and a transistor amplifier 21 having several transistor amplifier stages for amplifying the signal current supplied by one of the pickup devices 12, 14 and delivering the amplified signal currents to amplier output terminals 26 which are connected through a thin, flexible multi-conductor cord 37 to an output device or receiver 38, such as an ear phone held in the ear of the user, or a bone-receiver worn against a bony part of the user's head.

One of the selectively used signal pickup devices, for instance pickup device 12, may be an electromagnetic microphone, for instance of the type described in Pearson Patent 2,927,976, which picks up and transduces propagated sound into corresponding signal currents, and has a ferro-magnetic core surrounded by pickup windings 13. The other signal pickup device 14 likewise has a ferromagnetic core surrounded by pickup windings 15 arranged so that when placed adjacent the receiver of a conventional telephone, it will pick up by magnetic induction, signals corresponding to the voice currents in such telephone receiver, as described, for instance, in Patent 2,441,840. The microphone 12 may be positioned with its diaphragm close to a casing opening 12—1 of the amplifier unit. The telephone pickup device 14 has its core positioned within casing 11 in a conventional way, so that on placing one of its flat casing walls over the receiver diaphragm of a conventional telephone pickup winding 15, it will be magnetically interlinked with the windings of the telephone receiver and have induced in its windings 15 corresponding voice currents. The selector switch 16 operated by grip 16—1 exposed on the exterior of casing 11, serves to selectively connect either microphone winding through input leads to the input stage of the transistor amplifier 21. The receiver 38 is likewise of the electromagnetic type, such as described, for instance, in Pearson Patent 2,493,734, and has a ferromagnetic core surrounded by transducer windings 39.

The transistor amplifier 21 may be of any of the known audio-frequency transistor amplifiers having, for instance, two or more gain stages with a transistor in each gain stage, and an output stage with a single power output transistor or with a push-pull output stage having two push-pull-connected output transistors. As an example, it may be of the type described in Patent 2,927,276, with a single output transistor, or modified, for instance, in the manner described in any one of Patents 2,847,519; 2,866,193; 2,887,540; 2,896,029, to operate with two push-pull-connected transistors for delivering push-pull amplified signal output to the windings 39 of the receiver or output device 38. The transistor amplifier 21 shown, has such push-pull output stage operating with two push-pull-connected junction transistors 24 each having a base, an emitter and collector, shown by conventional symbols. Although the transistors 24 shown are of the PNP type, they may be of opposite conductivity, in which case the polarity of the associated direct-current circuits is reversed.

The amplified signal output of a next-preceding transistor amplifier stage, which may likewise operate with two push-pull-connected transistors, is impressed in push-pull through the two base leads 22 and a common emitter lead 23 between the base and emitter of the two push-pull-connected output transistors 24. The electrodes of the two push-pull output transistors 24 are maintained at the proper D.C. bias by connecting their collectors through collector-bias leads 25 to D.C. biasing circuits of the transistor amplifier 21. The amplified push-pull signal current output is delivered in push-pull through two collector output leads 26 from the collectors of the two output transistors 24 by way of two conductors of the flexible connector cord 37 to end terminals of the windings 39 of the output device or receiver 38.

The push-pull circuit from the collectors of the two output transistors 24 to the receiver windings 39 is completed on one side by connecting their common emitter lead 23 through a ground lead 28 to the casing 11 of the amplifier unit, which constitutes a ground, as indicated by ground symbol 29. The other side of the push-pull output circuit is completed by connecting an intermediate or midpoint of transducer output winding 39 through the third conductor of a flexible connector cord 37, by way of amplifier conductor 32 and the D.C. supply circuit of battery section 50 of the amplifier unit to its casing 51, which forms a circuit ground, as indicated by ground symbol 29. For the purposes of this application, it is assumed that the casing 11 of the amplifier unit and the casing 51 of its battery section are of metal, and that the two metallic casings 11, 51 are in electrical contact engagement with each other and form a common circuit ground for the amplifier circuits and the battery section 50 of the transistor amplifier 21.

In accordance with the invention, instead of operating the hearing-aid amplifier unit 10 of the type shown, with a battery unit formed of one or several structurally united battery cells arranged for replaceable positioning in the casing 11 of the amplifier unit 10, the transistor amplifier unit 10 is arranged for detachable cooperation with different separable battery units or sections, each of the different cooperating battery sections being arranged to replaceably hold a larger or smaller number of battery cells parallel to each other, with their alike battery poles oriented in the same direction. In other words, in accordance with the invention, the transistor-amplifier hearing-aid unit 10 of the type described above, is combined with one of a series of different battery units containing larger or smaller numbers of battery cells for causing the transistor-amplifier 21 of the amplifier unit 10 to operate with a larger or smaller amplifying gain and power, depending on the needs of the user.

FIG. 1 shows, by way of example, the battery section or unit 50 arranged for detachable interconnection with the amplifier unit 10 into a miniature-size, integral structure small enough for hidden wear on the body of the user, and detachably holding four alike battery cells 52, 53, 54, 55, indicated by the conventional battery cell symbol. As indicated diagrammatically, each battery cell 52–55 forms an elongated unit with an elongated casing 56, having exposed opposite-polarity cell poles on its small opposite ends, and they are detachably held in the battery unit 50 parallel and adjacent to each other and with alike poles oriented in the same direction.

The battery unit 50 and its metallic casing 51 has also insulatingly mounted and carries thereon a set of metallic battery connector terminals 1–P, 2–P, 3–P, and 4–P, respectively, arranged to automatically engage and make good electrical connection with a set of cooperating metallic amplifier supply terminals 1–S, 2–S, 3–S and 4–S, respectively, insulatingly mounted in and carried by amplifier casing 11. Each of one set of these metallic terminals, for instance the four metallic supply terminals 1–S to 4–S, of the amplifier casing 11, has a resiliently flexible metallic spring projection biased to establish good contact engagement with the respective battery connector terminals 1–P to 4–P of the battery unit, when the two metallic casings 11 and 51 are joined or assembled or affixed into an integral amplifier-battery unit, as shown partially diagrammatically in FIG. 1. Although the principles of the invention are described herein in connection with an amplifier unit 10 and a battery unit 50 having internesting metallic casings 11 and 51, respectively, their casings may be formed of insulating plastic or resin material, in which case provision is made that their grounded circuit portions are automatically connected, as by another pair of interconnecting terminals similar to terminals 1–P and 1–S, just described.

As stated before, in accordance with the invention, provision is made to assure that the user has no difficulty in replacing with a fresh battery cell, an exhausted battery cell or several exhausted battery cells 52 to 55 of the battery unit 50. To this end, each of the set of elongated battery cells 52 to 55 has alike poles oriented in the same direction when they are operatively held or positioned within the battery casing 51. By way of example as seen in FIG. 1, each of the elongated battery cells 52 to 55 is of the conventional type, having its metallic positive pole exposed at its right end, and its opposite metallic negative pole exposed at its left side. In the form in which they are generally available for sale, each such elongated battery cell is coated on its cylindrical exterior with a film of insulating material, such as a plastic film, having an exposed, visible legend, such as an arrow, marked with a plus (+) sign, indicating the positive terminal or pole of the respective battery cell, which assures easy identification of the positive pole end thereof. Each such battery cell 52 to 55 is arranged to be replaceably held and restrained in a predetermined cell position within the battery casing 51, by detachable engagement of its respective opposite cell poles with a distinct pair of metallic battery terminals 61, 62 insulatingly mounted as relatively fixed parts of the battery casing 51. In FIG. 1, each pair of battery terminals 61, 62 has one battery terminal, for instance battery terminal 62, which engages the positive pole of the respective cells 52 to 55 with a plus (+) sign, and each opposite battery terminal 61 shown marked with a minus (−) sign. In the commercial for of battery casing 51 shown, the interior bottom surface of the battery casing 51 underlying the array of elongated battery cells 52 to 55, has on the inward bottom surface of each cell compartment a minutely thin imprinted label, for instance of insulating plastic material, imprinted with an arrow and a plus (+) sign, which instructs the user that a replacement cell should be inserted into the respective cell compartments of the battery casing 51 with the correspondingly oriented plus (+) sign cell polarity.

The metallic connector terminals 1–P, 2–P, 3–P and 4–P and the opposite-polarity terminals 61, 62 of each cell compartment of battery casing 51, are interconnected to each other by a series of relatively insulated conductors 64, 65, 66, 67, 68, 69, 71, 72, 73, 74, 75, 76, and to the casing 51 with its ground 29, in such manner that all battery cells 52 to 55 are serially connected to the transistor amplifier 21 of the amplifier unit 10, and that at least some of the battery cells 52 to 55 are properly connected to the biasing circuits of the transistor amplifier 21.

The amplifier unit 10 has an energizing switch 81 of the rotary type, for instance, with two interconnected metallic switch arms arranged to engage two cooperating contacts 82 for connecting or disconnecting the battery cells 52 to 55 of the battery unit 50 to or from the operating circuits of the transistor amplifier 21 when switch contacts 82 engage each other in the on-switch position, and to break the energizing connection when the switch arms 81 are moved to the off-position shown.

The movable switch arms 81 are arranged to be moved or rotated between the off-position shown and the on-position, by a control knob 84 rotatably carried by the amplifier casing 11. Control knob 84 has a knurled, peripheral portion which is exposed on the exterior of amplifier casing 11, and its rotary motion is transmitted to energizing switch 81 by conventional motion-transmitting means, indicated by dash-dot line 85, which is also shown connected to a movable or rotary tap arm 86 of a volume control resistance 87 of the transistor amplifier 21, so that by moving the rheostat tap arm 86 to different positions along volume control rheostat or resistance 87, the gain and volume of sound output are increased or decreased. With this arrangement, the motion-transmitting connections of the movable switch arms 81 and movable rheostat arm 86 to the rotary control knob 84 are so arranged that in the initial movement of the knob 84 (for instance, in counterclockwise direction) from the off-position in which it is seen in FIG. 1, the switch arms 81 will first be brought in contact engagement with contacts 82 for thereby energizing the circuits of the transistor amplifier 21, and also bring the rheostat tap arm 86 into the initial tap position along volume control 87. In the further rotation of control knob 84 in the same counterclockwise direction, the switch contacts 82 remain closed, and only the rheostat tap arm 86 is moved to different portions along the volume control resistance 87 for adjustably increasing the gain and power output of the transistor amplifier and the level of the sound output delivered by receiver 38.

By turning the control knob 84 from the desired adjusted volume control position, in reverse, clockwise direction, the volume of the sound output of the receiver 38 is first decreased until at the end of the clockwise rotation of control knob 84, it turns the energizing switch arms 81 to disengage them from their switch contacts 82 and bring them to the off-position shown. Since the details of such controls are well known in the art, they do not require further description.

In operation, assuming that clockwise rotation of control knob 84 from the position shown in FIG. 1, has brought switch arms 81 into engagement with switch contacts 82 and the rheostat arm 86, to a desired sound output volume position along resistance 87, the following operating circuits will be established:

From the amplifier casing 11 and its ground 29 through conductor leads 28, through common emitter lead 23 and its resistance 23—1, to the emitters of the two push-pull transistors 24, and through their two collectors and their two collector leads 26, thence through two leads of flexible cord 37 to the end terminals of output or receiver winding 39 of receiver 38; thence through the return circuit from center tap of receiver winding 39 through the lead of cord 37, amplifier conductor 32 and its conductor section 32—1 to the amplifier supply terminal 4–S, and the engaged battery connector terminal 4–P; thence through battery conductors 71, 72, 73, cell 53 and its two connector terminals 61, 62, through conductors 74, 75 and cell 52 and its two connector terminals 61, 62, through conductors 75, 76, to battery connector terminal 2–P and the engaged amplifier supply terminal 2–S; thence through the two switch contacts 82 with their switch arms 81 back through amplifier supply terminal 1–S and the engaged battery connector terminal 1–P; thence through conductors 64, 65 of the battery unit and cell 54 with connector terminals 61, 62, through conductors 66, 67 and cell 55 with its connector terminals 61, 62, and thence conductors 68, 69 to battery casing 51 and its ground 29, thus completing the energizing circuit of the four serially-connected cells 52 to 55 to the amplifier 21 and the associated amplifier circuits.

Additional operating circuits between the battery cells of the battery unit 50 and the transistor amplifier 21 are established from the two serially-connected cells 52, 53, through battery conductors 73, 72 leading from negative terminal of cell 53, through series resistance 87, the battery connector terminal 3–P and amplifier supply terminal 3–S engaged thereby, amplifier conductor 17 and transistor amplifier stages preceding the output transistors 24, return amplifier conductor 81—1, closed amplifier switch contacts 81, 82, amplifier supply terminal 3–S and battery connector terminal 3–P engaged thereby, and battery conductors 77, 76, which complete the circuit connections of the two battery cells 52, 53 to the preceding amplifier stages of transistor amplifier 21. It should be noted that all circuit conductors of the transistor amplifier unit 10 and its battery unit 50 are assumed to be provided with conventional insulatingly-coated conductor wires.

In accordance with the invention, the current-proportioning resistance 87 which is connected between the battery connector terminals 3–P, 4–P, is not embodied in the circuit of the transistor amplifier 21, but in the battery unit 50, so that when operating with a battery unit 50—2 having only one cell, in the manner described below in connection with FIG. 5, the three battery connector terminals 2–P, 3–P and 4–P may be directly connected to each other for operating the transistor amplifier 21 with reduced gain and power output, in accordance with the needs of the user.

With the transistor amplifier energized by closure of energizing switch contacts 81, 82 and volume control tap 86 of resistance 87 set in the proper adjusted position by control knob 84, the signal output of either microphone 13, or, as shown, of the telephone pickup 14, is impressed on the input side of the transistor amplifier 21 which will deliver a corresponding amplified signal output in push-pull to the output winding 39 of the output device or receiver 38. By actuation of selector switch 16, as by its knob 16—1, into contact engagement with the opposite contacts, the winding of microphone 13 is connected to the input side of the amplifier (instead of the telephone pickup winding), and the signal output of the microphone corresponding to the sound propagated on the exterior of the amplifier unit 10 will be amplified by the transistor amplifier 21 and impressed in push-pull on the output winding 39 of receiver 38 for delivering to the user a corresponding amplified sound output.

In a transistor amplifier unit 10 operating with a battery unit 50 in the way described above, the amplified signal currents flowing in the circuit of the transistor amplifier also flow through the battery cells such as battery cells 52 to 55 of the battery unit 50 which supply the operating energy for the transistor amplifier 21 which is positioned closely adjacent the battery cells and circuits of the battery unit 50.

As an example, all the signal current flowing in push-pull through the output winding 39 of the receiver 38 also flow through each of the series-connected battery cells, arrows applied to symbolic connections of each battery cell 52 to 55 to their cell connectors 61, 62, indicating the path and direction of a momentary signal current flowing through the respective cells. Each signal current thus flowing, for instance in the direction of the arrows through the respective battery cells 52 to 55, will induce around each cell 52 to 55 a magnetic field flux, the field forces of which are represented by face lines encircling the signal current path of the respective cell.

Since the D.C. supplying battery cells 52 to 55 are positioned closely adjacent the amplifier unit with its magnetic pickup transducers 12 and 14, the relatively strong field fluxes induced by the amplified signal currents through the battery cells 52 to 55 would be interlinked with the core and windings of the signal transducers 12 or 14, which supply the weak signal input to the transistor amplifier 21 and thus distort the weak signal output of such pickup device 12 or 14. The distorting action of the amplified signal currents flowing through the battery cells 52 to 55 on the input signals to the transistor amplifier 21, is magnified by the fact that the amplified signal current in each of the cells has at each moment the same direction, for instance as represented by the arrow applied to the current path of cells 52 to 55, so that the distorting signal-current fluxes of the several battery cells 52 to 55 are all superimposed on the signal output of the electromagnetic pickup device 12 or 14 which supplies its relatively weak signal input to the transistor amplifier 21.

In accordance with the invention, the battery unit 50 is provided with connector conductors which are positioned in closest proximity along the signal current path of each battery cell, and these conductors are so interconnected with the serially-connected cells 52 to 55 as to pass in close proximity and adjacent the current path of each battery cell 52 to 55, a signal current in a direction opposite to the direction of the signal current passing through the respective cells for minimizing their distorting magnetic field fluxes. In addition, all other circuit conductors of the battery unit 50 through which each cell or cell of the battery unit is connected with each other and with the battery amplifier connector terminals, have their conductor elements so arranged and located as to provide—for substantially each conductor portion of the battery unit carrying a signal current in one direction—another conductor portion carrying the same signal current in opposite direction, thereby neutralizing and minimizing the distorting effect of the field fluxes produced by signal currents passing through conductor portions of the battery unit.

FIG. 1 shows, as an example, one arrangement of circuit connections between the several battery cells 52 to 55 of the battery unit 50 and the closely adjacent amplifier unit 10, whereby the distorting signal field flux produced by amplified signal currents flowing in the various circuit elements of the battery unit on the signal input current of the transistor amplifier, is suppressed or minimized. As seen in FIG. 1, the elongated battery cell 52 which carries a momentary amplified signal current, marked by the arrow applied to its current path, has connected to its cell connector terminal 61 an insulated conductor 75 carrying the same signal current in opposite arrow direction, and closely adjacent the signal current path of cell 52, for neutralizing or for suppressing and minimizing the distorting field flux produced by the signal current through cell 52. In a similar manner, each of the other cells 53, 54 and 55 has serially connected in its circuit, an insulated, elongated conductor 73, 76 and 68, respectively, extending immediately adjacent the current path through the respective cell so as to carry in such conductor 73, 76, 68 a flux-field neutralizing signal current in the direction of the arrow applied thereto, which arrow direction is opposite to the arrow direction of the signal current flowing in the respective cells 53, 54 and 55.

In addition, all other conductor connections of the battery unit 50 extending between the individual cell terminal connectors 61, 62 and its casing ground 29 and also its amplifier connector terminals 1–P through 4–P, are so arranged that for each connector conductor portion carrying signal current in one direction, there is an adjacent other conductor portion carrying the same signal current in opposite direction, for thereby neutralizing or suppressing the distorting effect of magnetic fluxes induced by signal current through such connecting conductors.

In the battery unit of FIG. 1, the connector conductors 65, 67, 69, 71, 72, 74, are shown located in different positions along the battery unit in a manner generally corresponding to their location in the practical amplifier battery unit 50 of the invention, shown partially diagrammatically in this figure. Thus, the insulated conductors 65 and 67 which carry signal current in the direction of the current arrows applied thereto, are located immediately adjacent the conductor 69 carrying signal current in opposite direction, all these insulated conductors 65, 67 and 69 extending in close proximity to each other adjacent the corner of the main wall 51 and the casing side wall or rim of the battery casing of the battery unit 50 along which they are shown positioned. Similarly, insulated conductors 74 and 76 extending adjacent the right side rim of battery casing 51, as seen in FIG. 1, and carrying amplified signal current in the direction indicated by their current arrows, are located immediately adjacent insulated conductor 72 carrying the same amplified signal current in opposite direction, as indicated by the current arrow applied thereto. Similarly, conductor 71 of the battery unit, which extends closely to the overlying side wall or rim of amplifier casing 11 and carrying signal current in the direction indicated by the arrow applied thereto, has immediately adjacent thereto insulated conductor 77 carrying oppositely-directed signal current, as indicated by the arrow applied thereto, for mutually suppressing the distorting field flux produced by their signal currents.

In addition, insulated conductor 64 extending from battery connector terminal 1–P and immediately adjacent the overlying casing side wall of the amplifier casing 11, and carrying the arrow-directed signal currents, has its distorting field flux neutralized or suppressed by positioning a conductor portion 32—1 of the amplifier unit immediately adjacent the other side of this amplifier casing side wall 11, and carrying the same but opposite arrow-directed signal current.

Figure 2:
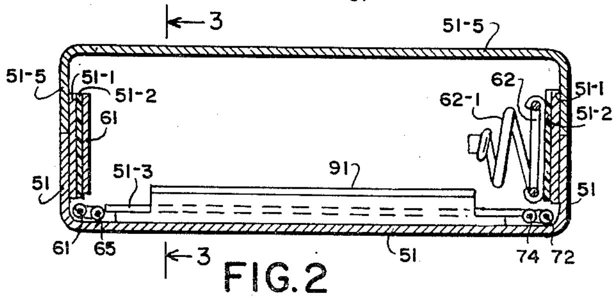
FIG. 2 is a transverse cross-sectional view of the structure of the battery section of FIG. 1, with the battery cells removed from their operative positions.

FIG. 2 is a cross-section of the actual construction of the casing 51 of a battery unit 50 of an integral hearing-aid unit, shown partially diagrammatically in FIG. 1. The battery casing is similar to the amplifier casing described in connection with FIGS. 1 to 17–C of Gage Patent 2,789,160. It has a generally flat, oblong or rectangular shape, and is formed of thin, non-magnetic sheet metal, such as a practically non-magnetic grade of stainless steel. The major bottom wall of battery casing 51 is surrounded by an upstanding casing rim wall having affixed to its bottom rim wall and side rim walls bordering the cell-housing space (FIG. 2), wall flanges 51—1 which project above the upper edge of the rim side walls of casing 51. The casing wall flanges 51—1 are enclosed by side rims 51—6 of a battery compartment cover wall 51—5 likewise made of non-magnetic sheet metal such as stainless steel. The side rims 51—6 of the casing cover wall 51—5 have hinge-arms 55—7, broken-away portions of which are shown in FIG. 1, through which the cover wall 51—5 is pivotally connected, as by pivot pins 55—8, to the adjacent portions of casing side-wall flanges 51—1. With this arrangement, the cover wall 51—5 may be hinged upwardly on its hinge pins 55—8 from the closed position shown in FIG. 2, to a lifted position in which the entire space of the cell compartment of casing 51, as seen in FIGS. 1 and 2, is exposed for enabling replacement of each of the several battery cells 52 to 55 with fresh battery cells.

Against the metallic side-wall flanges 51—1 (FIG. 2) of battery casing 51, are insulatingly secured the sets of opposite-polarity, plate-shaped, metallic cell-conductor terminals 61, 62. In the form shown, a film 51—2 of insulating material such as polyethylene film, is cemented with one surface of the inwardly facing surface of casing side wall flange 51—1, and with the opposite surface to the metallic conductor connector terminals 61, 62, respectively. Any of the known metallic cements may be used for providing a strong insulating joint of the terminal plate members 61, 62 to the underlying insulator sheet 51—2 and its underlying metallic casing flange 51—1. As an example, the known cyanoacrylate adhesives, such as sold commercially under the tradename "Eastman 910" by Eastman Kodak Company, may be used for this purpose.

One of each pair of cell connector terminals 61, 62, such as terminal plate member 62, of each cell compartment, is arranged to hold, as by flanges, the adjacent end turn of a conventional, helical compression spring 62—1 arranged so as to engage with its relatively flat free end the facing end terminal of a battery cell positioned between the terminal spring 62—1 and the opposite cell connector terminal 61.

Figure 3:
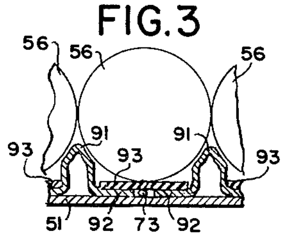
FIG. 3 is a cross-sectional view along line 3—3 of FIG. 2.

As indicated in FIGS. 1 to 3, and shown diagrammatically in FIG. 1, the cell space within the interior of the battery casing 51 is subdivided into individual cell compartments, by a plurality of cell-seating members 91 defining the seat or cell compartment for each of the respective battery cells 52 to 55. Each seating member 91 is shown formed of sheet material, for instance of sheet metal, and has a central, raised, folded sheet portion providing along the upwardly facing exterior (as seen in FIG. 3), diverging seating surfaces for engaging and seating the facing longitudinal segmental regions of the respective cell casings 56. Each folded seating member 91 has bottom side arms 92 which underlie the cylindrical casings 56 of the adjacent individual battery cells, and are affixed as by spot-welding, to the underlying surface of the battery casing 51. The facing edge surfaces of adjacent leg arms 92 of each seating member 91 leave between them a narrow, longitudinal space extending lengthwise along the overlying battery cell casing 56, through which elongated space extend the respective insulated conductors 66, 68, 73 and 75 for respective cells 54, 55, 52 and 53, and carrying amplified signal current opposite to the signal current carried by the respective cells. The other insulated connector conductors which extend between the cell terminals 61, 62, which extend transversely to the elongated axes of the respective cells 52 to 55, are positioned along the side corners between the main battery casing wall 51 and the lower edges of casing side-flanges 51—1.

In accordance with the invention, the amplifier unit 10 forms a self-supporting unit designed for ready removal and replacement in operative position in an amplifier compartment of a battery casing 51. The amplifier unit is enclosed in a flat casing having casing walls 11 similar to casing walls 51, 51—5 of the battery unit of FIG. 2, which enclose on substantially all sides the components and circuit elements of the transistor amplifier unit 10 described above, and designed to replaceably fit within the amplifier compartment provided in the upper part of battery casing 51, as seen in FIG. 1. The complementary casing walls of such amplifier unit may, for instance, be formed by the complementary casing wall portions of the hearing-aid casing described in Gage Patent 2,789,160, modified to enclose only the amplifier components including its two signal pickup devices 12, 14, with exposed connector terminals 31 for the plug of receiver cord 37 and exposed supply terminals 1–S, 2–S, 3–S and 4–S for automatically establishing the operating circuit connections with the circuits of the battery unit 50, such as described above. The extended, overlapping casing walls of the battery casing 51 and of such amplifier casing 11 have an aligned microphone opening, such as indicated at 12—1 in FIG. 1, through which the microphone 12 of the amplifier unit 10 picks up sound in the surrounding space. The relatively extended amplifier casing wall opposite to that having the microphone opening 12—1, forms a continuation of the battery cover wall 51—5, so that the battery casing wall 51 encloses only one major outer amplifier casing wall 11 and portions of its three rim side walls fitting within and against the upper rim wall, and the adjoining two side rim walls of the upper section of battery casing 51, as seen in FIG. 1.

Figure 4:
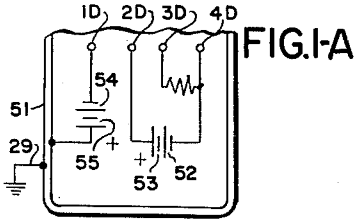
FIGS. 4 and 5 are views similar to FIG. 1, of different battery sections and of the adjoining amplifier section of such amplifier unit, whereby the same amplifier section is energized with successively smaller numbers of serially connected battery cells for operation with the desired selected smaller gain and power output.
Figure 4:
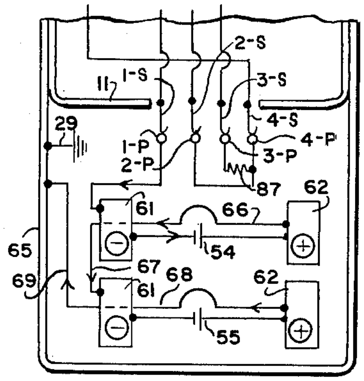

In accordance with the invention, the same encased amplifier unit, such as amplifier unit 10 described above, is arranged for forming with different, selected battery units having smaller or larger numbers of serially-connected, alike battery cells, self-supporting, integral, fully operative hearing aids, or in general, audio-frequency sound-transducing units of selected desired power output. FIGS. 4 and 5 show partially diagrammatically, examples of two different battery units designed in accordance with the invention to selectively form with the self-supporting, encased amplifier unit 10 of FIG. 1, a complete encased, integral, fully-operative hearing-aid which delivers desired, selected, different maximum amplified sound outputs.

The hearing aid of FIG. 4 has a battery casing of smaller size for holding in its cell compartments only two battery cells, such as only serially-connected cells 54 and 55 of the hearing-aid unit of FIG. 1. The battery unit 50 of FIG. 4 has connecting conductors 66, 68 extending immediately adjacent each cell for carrying oppositely directed flux-field neutralizing signal current, and also sets of field-neutralizing connecting conductor portions 67, 69, and conductor 64, the field of which is neutralized by adjacent amplifier conductor 32—1, arrows indicating the direction of their respective signal currents.

Figure 5:
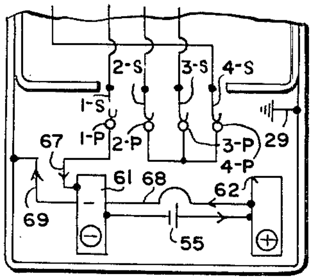

In a similar way, the hearing aid of FIG. 5 has a battery casing holding only one cell, such as cell 55, with similar field-neutralizing, connecting conductor 68 for the cell 55, and similar pairs of field-neutralizing connecting conductors 67, 69 and 64, 32—1.

In an analogous manner, the battery unit may be designed to operate with any other required number of alike battery cells to provide for neutralization and suppression of distorting field fluxes produced by amplified signal currents flowing through the cells and the cell connector-circuits of such battery unit.

It will be apparent to those skilled in the art that the novel principles of the invention disclosed herein in connection with specific exemplifications thereof, will suggest various other modifications and applications of the same. It is accordingly desired that in construing the breadth of the appended claims, they shall not be limited to the specific exemplification of the invention described above.

We claim:

1. In a transistor amplifier for amplifying a signal input and having at least one transducer including a ferromagnetic core with windings interlinked with said core and a transistor amplifier circuit including said windings, said amplifier circuit passing signal current through said windings and constituting a compact amplifier unit, a battery unit comprising at least one elongated battery cell and means detachably holding said cell closely adjacent to said amplifier circuit, connecting conductors connecting said cell with said amplifier circuit for supplying direct current thereto, said amplifier unit and said battery unit and all their connections being enclosed in a compact casing and being positioned in close proximity to each other, said connecting conductors connecting the windings of said transducer in series with said cell, said connecting conductors also passing signal current of said amplifier circuit, said signal current passing through each cell of said battery unit generating a magnetic leakage field which disturbingly interlinks with said core and said windings, said conductors including one conductor extending closely adjacent to each cell of said battery unit and connected to pass signal current in a direction opposite to the signal current through the cell adjacent to the respective conductor for minimizing disturbing magnetic interlinkage of signal current through said cell with said core and said windings.

2. In a transistor amplifier as claimed in claim 1, said connector conductors also including additional longitudinal conductors carrying amplified signal currents between said cell and the circuits of said transistor amplifier, at least two-thirds of the length of said longitudinal conductors consisting of adjacently positioned, parallel-extending, different conductors carrying signal currents, with substantially each length of said different parallel conductors being connected to carry substantially equal but oppositely-directed amplified signal currents and thereby suppress distorting magnetic fields produced by signal currents flowing through said parallel conductors.

3. In a transistor amplifier as claimed in claim 1, said amplifier unit constituting an integral, self-supporting unit detachably joined to said battery unit for forming therewith a unitary, self-supporting, portable, operative structure, said amplifier unit and said battery unit having cooperating sets of disengageable connector elements for selectively establishing the circuit connections between the circuit elements of said amplifier unit and of said battery unit, whereby said amplifier unit may be selectively joined to the casing of a selected different battery unit having a different number of battery cells selectively connected to said amplifier means through said cooperating connector elements.

4. In a transistor amplifier as claimed in claim 1, said amplifier circuit having a first and a second transducer each including a ferromagnetic core with windings interlinked with said core and both windings being included in said amplifier circuit, the core and windings of each transducer disposed in sufficiently close proximity with said cell to be subjected to disturbing interlinkage with magnetic leakage fields of said cell signal current.

5. In a transistor amplifier as claimed in claim 4, one of said transducers comprising a microphone and the other transducer comprising a receiver, the microphone winding being connected to the input side and the receiver winding being connected to the output side of said transistor amplifier circuit for supplying amplified pickup signals to said receiver.

6. In a transistor amplifier for amplifying a signal input and having at least one transducer including a ferromagnetic core with windings interlinked with said core and a transistor amplifier circuit including said windings, said amplifier circuit passing signal current through said windings and constituting a compact amplifier unit, a battery unit comprising a plurality of elongated battery cells and means detachably holding said cells closely adjacent to said amplifier unit with alike cell poles of said cells having alike orientation, connecting conductors connecting said plurality of cells in series with each other and with said amplifier circuit for supplying direct current thereto, said connector conductors also passing amplified signal current of said amplifier circuit through said serially-connected cells, the windings of each of said transducers being connected through said connecting conductors with said serially-connected cells and passing said signal current, the magnetic leakage field of signal current passing through said cells being disturbingly interlinked with said cores and each of said windings, said conductors including one conductor for each of said cells extending along and adjacent each of the respective cells and connected to pass the same signal current in a direction opposite to the direction of the cell signal current through the respective cell, for minimizing disturbing magnetic interlinkage of signal current passing through said cells with said core and said windings.

7. In a transistor amplifier as claimed in claim 6, said connector conductors also including additional longitudinal conductors carrying amplified signal currents between said cells and the circuits of said transistor amplifier, at least two-thirds of the length of said longitudinal conductors consisting of adjacently positioned, parallel-extending, different conductors carrying signal currents, with substantially each length of said different parallel conductors being connected to carry substantially equal but oppositely-directed amplified signal currents and thereby suppress distorting magnetic fields produced by signal currents flowing through said parallel conductors.

8. In a transistor amplifier as claimed in claim 6, said amplifier unit constituting an integral, self-supporting unit detachably joined to said battery unit for forming therewith a unitary, self-supporting, portable, operative structure, said amplifier unit and said battery unit having cooperating sets of disengageable connector elements for selectively establishing the circuit connections between the circuit elements of said amplifier unit and of said battery unit, whereby said amplifier unit may be selectively joined to the casing of a selected different battery unit having a different number of battery cells selectively connected to said amplifier means through said cooperating connector elements.

9. In a transistor amplifier as claimed in claim 6, said unit having a first and a second transducer each including a ferromagnetic core with windings interlinked with said core and both windings being included in said amplifier circuit, the core and windings of each transducer disposed in sufficiently close proximity with said cells to be subjected to disturbing interlinkage with magnetic leakage of fields of said cell signal currents.

10. In a transistor amplifier as claimed in claim 9, one of said transducers comprising a microphone and the other transducer comprising a receiver, the microphone winding being connected to the input side and the receiver winding being connected to the output side of said transistor amplifier circuit for supplying amplified pickup signals to said receiver.

No references cited.